United States Patent [19]

Kuni et al.

[11] 4,242,702
[45] Dec. 30, 1980

[54] APPARATUS FOR AUTOMATICALLY CHECKING EXTERNAL APPEARANCE OF OBJECT

[75] Inventors: Asahiro Kuni, Tokyo; Nobuyuki Akiyama; Yoshimasa Oshima, both of Yokohama, all of Japan

[73] Assignee: Hitachi, Ltd., Japan

[21] Appl. No.: 856,097

[22] Filed: Nov. 30, 1977

[30] Foreign Application Priority Data

Dec. 1, 1976 [JP] Japan ............................ 51/143329
Dec. 27, 1976 [JP] Japan ............................ 51/156504

[51] Int. Cl.³ ............................................. H04N 7/18
[52] U.S. Cl. ................................................. 358/106
[58] Field of Search ............... 358/93, 101, 106, 107

[56] References Cited

U.S. PATENT DOCUMENTS

| | | | |
|---|---|---|---|
| 3,887,762 | 6/1975 | Uno et al. | 358/101 |
| 4,041,286 | 8/1977 | Sanford | 358/107 |
| 4,079,416 | 3/1978 | Faani et al. | 358/106 |

Primary Examiner—Robert L. Griffin
Assistant Examiner—Joseph A. Orsino, Jr.
Attorney, Agent, or Firm—Craig & Antonelli

[57] ABSTRACT

An apparatus for examining an object such as a contact welded on a leaf spring in respect of geometrical and qualitative factors comprises an image pick-up device such as TV camera for detecting an optical image of the contact and the leaf spring having a dark portion along the contour of the contact and converting the optical image into corresponding video signals which are then compared with a predetermined threshold level to be converted into a binary encoded signal having two logic levels corresponding, respectively, to bright and dark portions of the optical image. Frequency distributions of the binary signal representing the dark portion are determined along two orthogonal directions thereby to define a coordinate of a region in which the contact is located. A first checking device is provided to determine if the above coordinate is located in a preset allowable tolerance range. A second checking device is additionally provided which serves to define a frame of a size differed from that of the contact in dependence on the coordinate thereby dividing the area within the frame into a predetermined number of picture elements in a matrix array, whereby faults of the contact such as injury, welding dust or deformation are detected in dependence upon a predetermined combination of the picture element signals representing the dark portions of the optical image.

23 Claims, 14 Drawing Figures

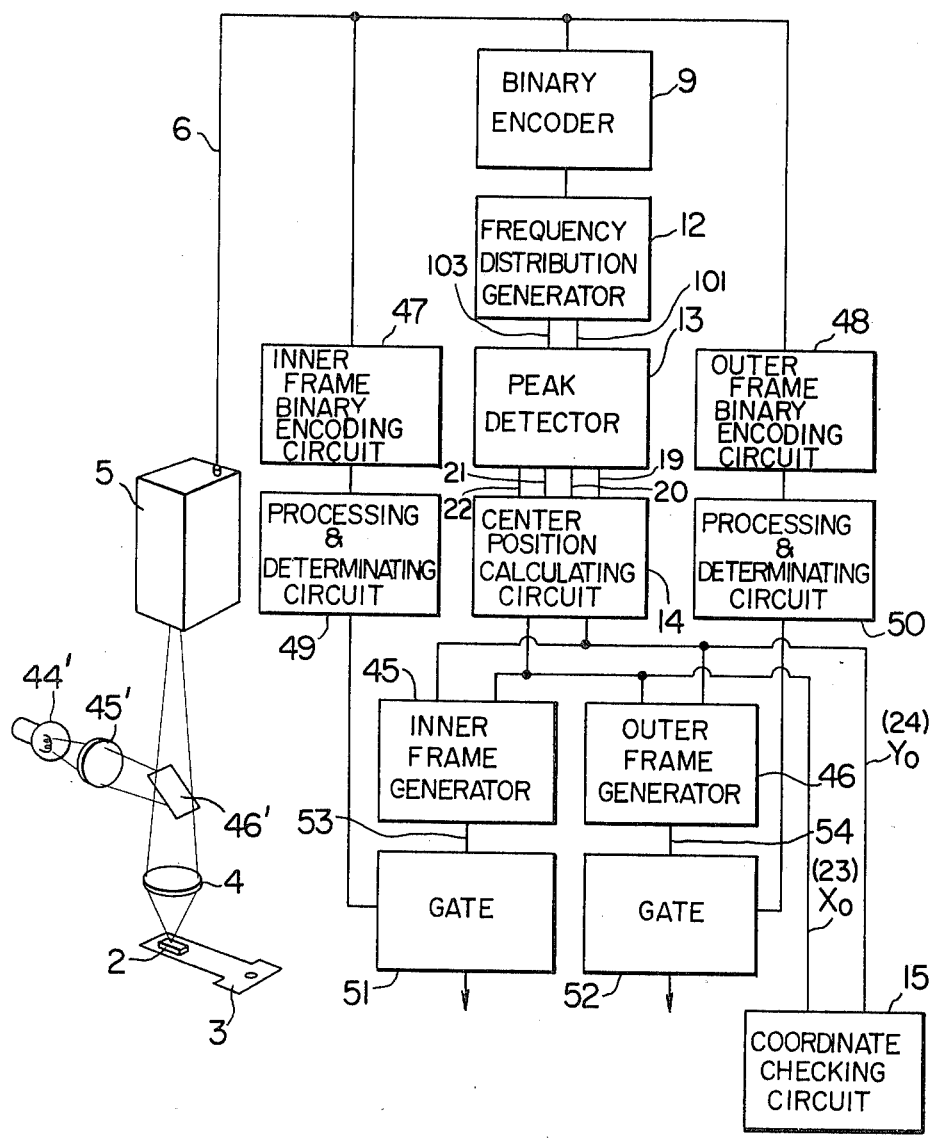

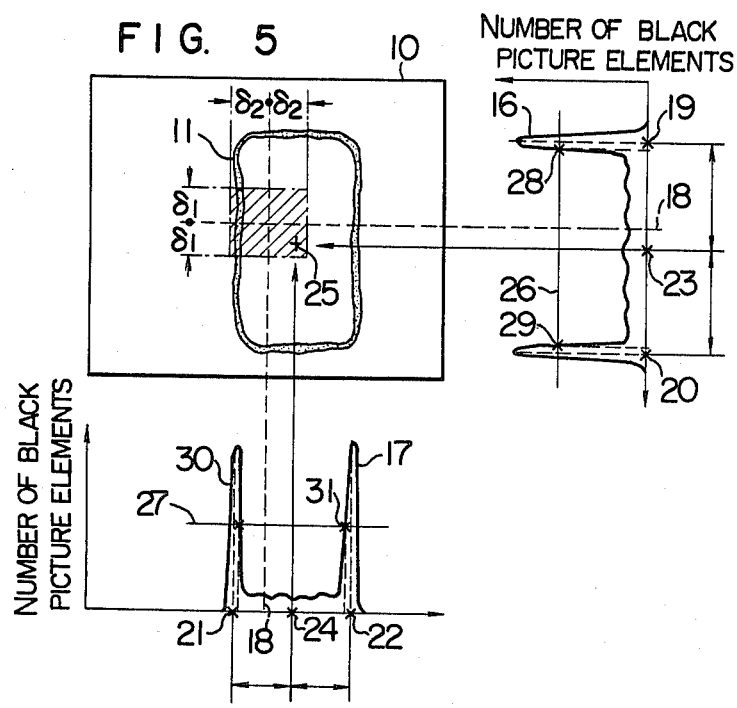
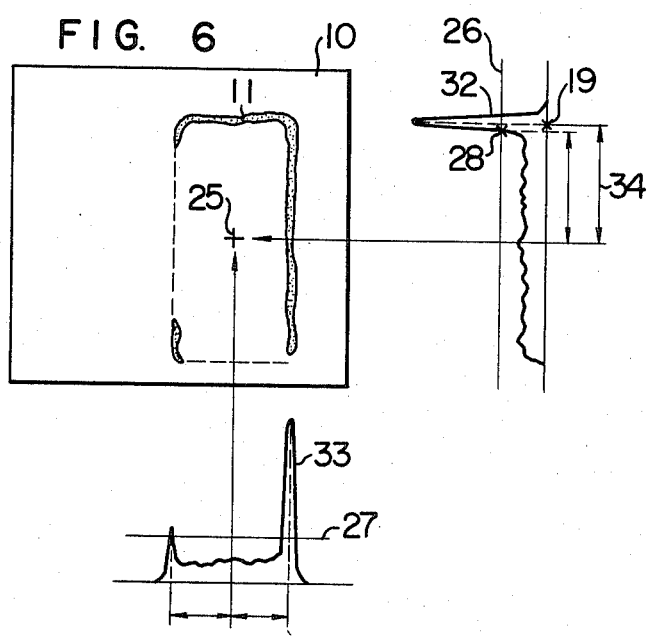

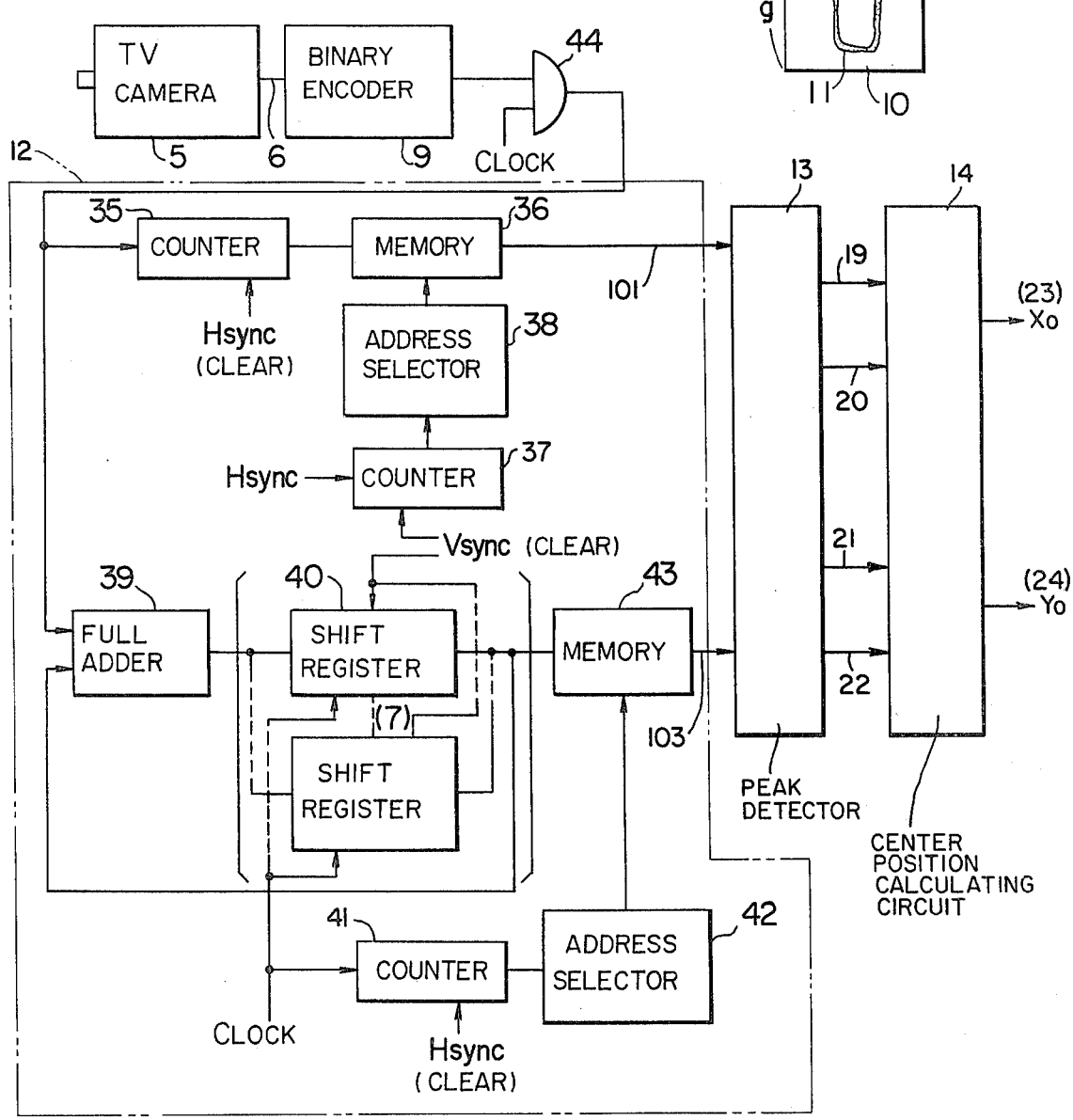

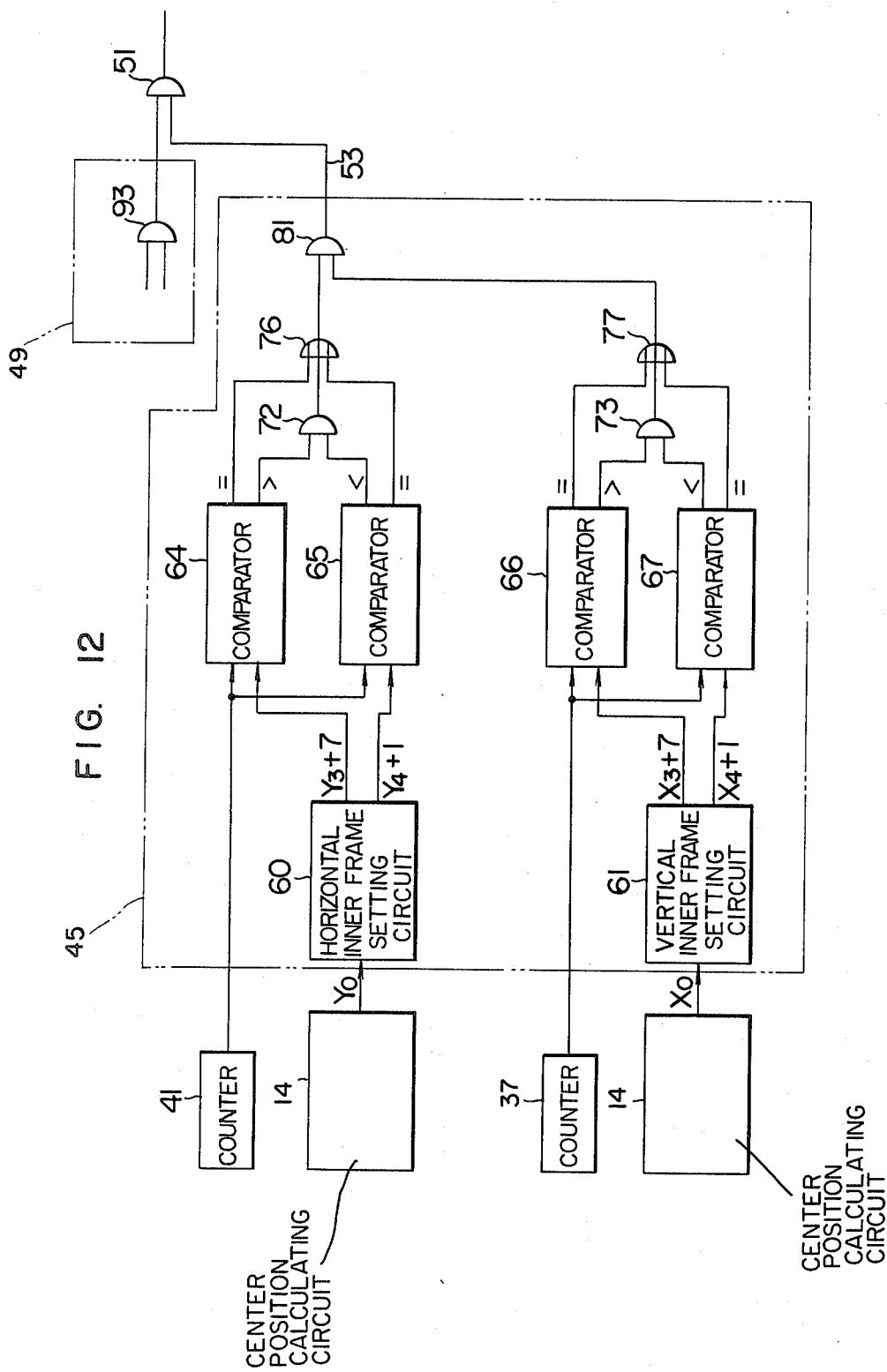

APPARATUS FOR AUTOMATICALLY CHECKING EXTERNAL APPEARANCE OF OBJECT

LIST OF PRIOR ART REFERENCES (37 CFR 1.56 (a))

The following references are cited to show the state of the art:
(1) Japanese Patent Application Laid-Open No. 18473/74, Sumiya, Feb. 18, 1974
(2) Japanese Patent Application Laid-Open No. 102467/76, Tamai, Sept. 9, 1976

BACKGROUND OF THE INVENTION

The invention relates to an apparatus for automatically examining or checking an external appearance of an object such as a contact welded to a leaf spring employed in relays, switches or the like in respect of the size, position, presence of failure or the like items.

The items in respect to which the object such as the contact is to be checked may include presence of foreign matter adhering to the surface, whether such foreign matter projects outwardly remarkably from the side of the contact, whether the contact has a sufficient contacting area to attain a good electrical contact when closed, whether the deviation of the relative position of contacts to be closed is in an allowable tolerance range, and so forth. When the contact is formed with a continuous injury of a predetermined length or deposited with an adhesive foreign substance of a predetermined size, then the contact is to be excluded as fault. The same will apply to the contact deposited with welding dusts adhering to the periphery thereof or one which has undergone a welding deformation which would deteriorate the electrical insulation when the contact is opened.

The examination of the object such as the contact in respect of many items has been heretofore carried out through visual observation. However, since the object to be dealt with has a miniature size, unsatisfactory contacts are often overlooked particularly when a large number of contacts or the like objects are to be checked, which involves of course a degraded reliability of the passed object in the operation or performance thereof.

SUMMARY OF THE INVENTION

An object of the invention is to provide an apparatus for examining automatically with a high reliability objects such as contacts in respect to whether the object or contact has a predetermined area, whether it is positioned in an allowable tolerance range or whether it has a continuous injury or foreign substance of a certain length.

Another object of the invention is to provide an apparatus which is capable of examining automatically with a high reliability whether a foreign substance adheres to the surface of object such as contact in a outwardly projecting state.

According to the invention, there is provided an apparatus for automatically checking the external appearance of an object having a surface area of a predetermined size and a contour of the surface, comprising: an imaging and image pick-up device including an optical system for illuminating said object to produce an optical image having differential bright and dark portions between the surface area and the contour, the device receiving the optical image to produce a corresponding picture signal; a binary encoder circuit for comparing the picture signal with a predetermined threshold value to produce a binary signal having two logical levels corresponding to the bright and dark portions of the optical image; a coordinate determining means for determining frequency distributions in vertical and horizontal directions for one of the two levels of the binary signal in a binary encoded signal image constructed from the binary signal produced by the binary encoder circuit, thereby to determine in accordance with the frequency distributions a region coordinate for a region in which the object is positioned; a first check means for checking the position of the object by determining whether the region coordinate is within an allowable tolerance range preselected in the binary encoded signal image; and a second check means for setting a frame of a predetermined size on the binary encoded image in dependence on the region coordinate and dividing the binary encoded signal image within the frame into m×n picture elements through a sequential shift of the binary signal, thereby to check the distribution of either one of the two levels of the binary signal by a combination of the picture elements.

The second check means defines an outer frame of a size greater than the size of the object in the binary encoded signal image in dependence on the region coordinate, divides a region at the outside of said outer frame into p×q picture elements and evaluates the object as a fault when all of the p×q picture elements are those representing the dark portion of the optical image of the object.

BRIEF DESCRIPTION OF THE DRAWINGS

FIG. 3 is a block diagram showing a general arrangement of an apparatus constructed in accordance with the teachings of the invention.

FIG. 5 shows a binary coded signal image of the contact shown in FIG. 1 together with frequency distributions of black picture elements.

FIG. 6 shows a binary encoded signal image of a contact together with frequency distribution of black picture elements in the case where peripheral portions of the contact image are blurred.

FIG. 7 is a circuit diagram showing an arrangement of a frequency distribution generator circuit.

FIG. 8 illustrates a number of sampling and number of scanning lines for a binary encoded signal image.

FIG. 12 is a circuit diagram showing an arrangement of an inner frame generator circuit shown in FIG. 3.

DETAILED DESCRIPTION OF THE PREFERRED EMBODIMENTS

Figure 1:
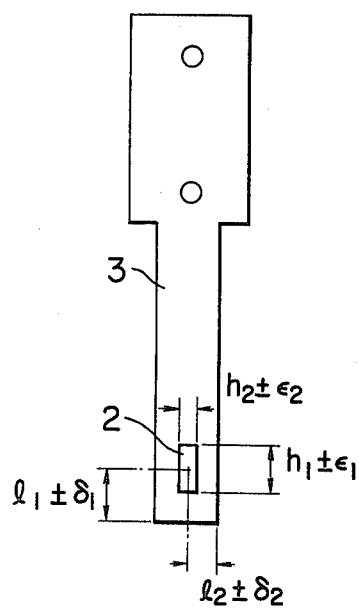
FIG. 1 is a top plan view of a contact welded on a leaf spring which is to be examined by an apparatus according to the invention.

In the first place, reference is made to FIG. 3 which shows a general arrangement of an automatic external appearance inspecting apparatus constructed in accordance with an embodiment of the invention. In this figure, reference numeral 2 denotes an object or article which is to be inspected or examined by the apparatus according to the invention and is assumed, by way of example, to be a rectangular contact welded onto a leaf spring 3. Specifications of the contact 2 relative to the external appearance thereof, i.e. the items in respect to which the contact 2 is examined may include whether the size of the contact 2 meets the minimum dimensional requirements concerning the length ($h_1 \pm \epsilon_1$) and the width ($h_2 \pm \epsilon_2$) illustrated in FIG. 1, whether the contact 2 is disposed on the leaf spring 3 at a position in an allowable range defined by a longitudinal dimension ($l_1 \pm \delta_1$) and a transversal dimension ($l_2 \pm \delta_2$), whether injuries or foreign substances are present in the surfacial area of the contact 2, whether welding dusts or deformations of remarkable size e are present in the regions located close to the periphery of the contact 2 as covered by a short distance d (on the order of about 0.2 mm), and so forth. In this connection, it is to be noted that the tolerances $\epsilon_1$ and $\epsilon_2$ are maintained extremely strictively on the order of 0.01 to 0.03 mm, while the tolerances $\delta_1$ and $\delta_2$ are on the order of 0.1 mm. Consequently, in order to examine the contact 2 in respect to the above enumerated items, the size of the contact 2 and the location thereof have to be examined independently from each other through separate procedures.

Figure 2:
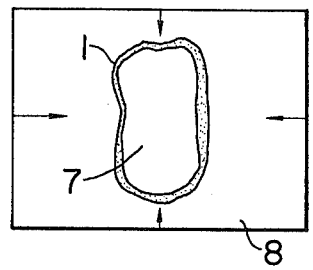
FIG. 2 is an optical image of the contact shown in FIG. 1 and picked up by a TV camera.
Figure 4:
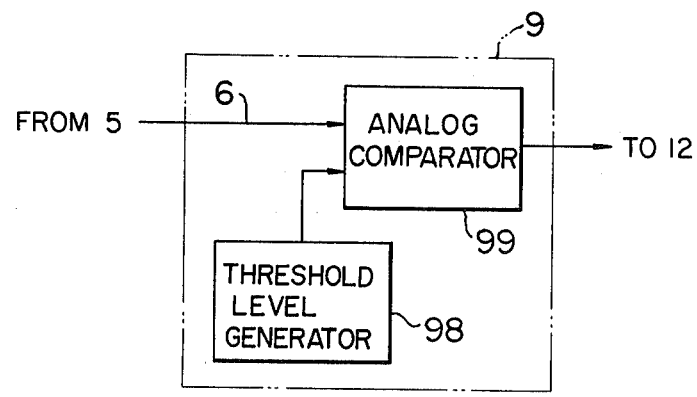
FIG. 4 is a schematic circuit diagram showing a binary encoder circuit shown in FIG. 3.

Referring again to FIG. 3, the contact 2 and the leaf spring 3 are illuminated by a light beam from a light source 44' through a condenser lens 45' and a half-mirror 46', as a result of surfaces of the contact 2 and the leaf spring 3 appear as bright regions when viewed vertically through the half-mirror 46', while the outer edge or contour 1 of the contact 2 offset from the leaf spring 3 will appear as a dark region. The images of the contact 2 and the leaf spring 3 thus produced through irradiation are then picked up by an image pick-up device such as TV camera 5 after having been magnified through a lens 4 with a magnification factor of about 50 and projected to an image screen (not shown) of the TV camera 5. In place of the TV camera, any suitable image pick-up device capable of performing a line scanning function such as photo-diode array or the like may be employed. In the TV camera 5, the image 7 of the contact 2 and the image 8 of the leaf spring 3 are converted into a series of video or picture signals through the raster scanning. These images 7 and 8 are illustrated in FIG. 2 as a bright-and-dark (white-and-black) pattern. The video signal 6 output from the TV camera 5 is then applied to a binary encoder circuit 9 which serves to compare the video signal 6 with a preselected threshold level $V_1$ thereby to produce a corresponding binary signal having two discrete signal levels corresponding to the bright and the dark portions of the composite image 7 and 8. To this end, a threshold generator circuit 98 and an analog comparator circuit 99 are provided in association with the binary encoder 9 as shown in FIG. 4. In FIG. 3, reference numeral 12 denotes a frequency distribution generator circuit the function of which will be now explained referring to FIG. 5. Referring to this figure, it is assumed that an image of the contact 2 on the leaf spring 3 is picked up by the TV camera 5 and converted into a binary encoded video signal through the binary encoder circuit 9, which signal represents an image 10. Then, the frequency distribution generator circuit 12 will count the number of picture elements in the black region along the ordinate and the abscissa thereby to produce a vertical frequency distribution curve 16 and a horizontal frequency distribution curve 17, respectively. The image 10 which may be referred to as the binary encoded signal image contains a black region 11 which corresponds to the contour or profile of the contact 2 and is represented by one logic level of the binary signal. An example of the frequency distribution generator circuit 12 will be explained in conjunction with FIG. 7.

Reference numeral 13 shown in FIG. 3 denotes a peak value detector circuit the function of which will be now explained referring to FIG. 5. Through the peak value detector circuit 13, the vertical frequency distribution curve 16 is divided into two parts along the center line 18 of the binary encoded image 10 and upper and lower positions 19 and 20 at which the peak or maximum values make appearance are detected. In a similar manner, the horizontal frequency distribution curve 17 is divided into two regions by the center line 18 of the binary encoded image 10 and the positions 21 and 22 of the peak values in the right and left regions are detected.

Referring to FIG. 3, a center position calculating circuit 14 is connected to the output of the peak value detector circuit 13. The circuit 14 serves to arithmetically determine center coordinates 23 and 24 of the vertical and horizontal distribution curves 16 and 17, respectively, by averaging the coordinates 19 and 20 of the peak values in the vertical direction (along the ordinate) and by averaging the coordinates 21 and 22 of the peak values in the horizontal direction (along the abscissa).

A coordinate determinating and checking circuit 15 shown in FIG. 3 operates to determine the center position 25 of the contact 2 having the contour 1 on the basis of the coordinates 23 and 24 in the vertical and horizontal directions and check if the center position 25 of the contact 2 lies in a tolerance range ($\pm \delta_1$, $\pm \delta_2$) in respect to the center or reference position of the image 10.

In this manner, the binary encoded signal image 10 as produced by the binary encoder circuit 9 is resolved into a number of picture elements by a clock pulse signal, from which the frequency distributions of black picture elements both in the vertical and horizontal directions of the contour 11 are determined by the frequency distribution generator circuit 12. The peak value detector circuit 13 determines the peak value coordinates (19, 20; 21, 22), from which the center position 25 of the contact 2 is calculated by the center position coordinate calculating circuit 14. Finally, the position coordinate determining and checking circuit 15 determines whether the center position 25 lies in a predetermined reference region of the image 10 defined by the tolerances $\pm \delta_1$ and $\pm \delta_2$ in respect to the center position of the image 10, thereby to examine if the contact 2 has been welded to the leaf spring 3 at a correct position.

To determine the center position coordinate 25 with a higher accuracy, a vertical threshold level 26 and a horizontal threshold level 27 are provided for the vertical and horizontal distribution curves of FIG. 5 respectively. The setting of such threshold levels may be effected either in a stationary manner or in a floating manner depending on the shapes of the distribution curves. The intersections between the threshold levels and the associated frequency distribution curves, i.e. the upper boundary position 28, lower boundary position 29, left boundary position 30 and the right boundary position 31 are substituted for the positions 19, 20; 21, 22 of the peak or maximum values.

In the case of an example such as shown in FIG. 6 in which one of the maximum or peak values of both the vertical and horizontal frequency distribution curves is indefinite and spurious components due to dusts present around the contact 2 or other noise sources will become more prominent, the setting of the threshold levels as described above is particularly advantageous. In the exemplary case shown in FIG. 6, it can be seen that the right and left maximum values of the horizontal frequency distribution curve 33 exceed the threshold level 27 thereby to allow the horizontal center coordinate to be determined, while the lower maximum value of the vertical frequency distribution curve 32 is indefinite. In such a case, a point which is spaced for a half standard dimension 34 ($h_{\frac{1}{2}}$) of contact 2 from the upper peak coordinate 19 or intersection 28 thereof with the threshold level 26 is presumed as the vertical center coordinate of the vertical frequency distribution curve 32.

It should be mentioned that the image pick-up device such as TV camera 5 is stationarily disposed at a predetermined position, while the contacts 2 or the objects to be examined are sequentially fed to a position under the TV camera 5 in a step-by-step manner by means of a carrier means such as a belt conveyor on which the leaf springs 3 with the contacts welded thereon are fixedly mounted and held in place by suitable holding means. Since the relative position between the leaf spring 3 and the image pick-up screen of the TV camera 5 can be fixed, it is possible to detect any positional deviation of the welded contact 2 from the reference position.

Next, description in detail will be made on the frequency distribution generator circuit 12 by referring to FIGS. 7 and 8. As described hereinbefore, the video signal from the TV camera 5 is converted into a binary coded signal through the binary encoder circuit 9. The binary signal thus obtained is applied to a gate 44 together with a clock signal to be sampled under the timing of the clock pulse. It is assumed that the number of sampling is selected to be equal to f in the horizontal direction (scanning direction) with the number of the scanning lines in the vertical direction being selected equal to g, as is shown in FIG. 8. Then, the generation of the vertical frequency distribution curve 16 for determining the center coordinate of the contact 2 in the vertical direction (along the ordinate) may be effected by counting the number of the black picture elements appearing in the direction of the scanning lines. To this end, a counter 35 is provided to count the number of black picture elements appearing in the sampled binary signal during a single scan line. This counter 35 is adapted to be cleared by a horizontal synchronizing signal $H_{sync}$. The contents in the counter 35 is loaded into a memory 36 immediately before being cleared. The number of horizontal synchronizing or clear pulses are counted by another counter 37, thereby to correlate the sequential order of the scanning lines and the contents stored in the memory 36 through an address selection circuit 38. In this manner, the number of the black picture elements counted during the single scanning line by the counter 35 is stored in the memory 36 at an address associated with the above scanning line. Thereafter, the counter 35 is reset by the horizontal synchronizing signal $H_{sync}$ to become ready for the counting for the succeeding scanning line. The capacity of the counter 35 is selected to be compatible with the number f which is the possible maximum number of the black picture elements appearing in the single scanning line, while the capacity of the memory 36 is so selected that at least the maximum count f can be stored for g scanning lines.

On the other hand, generation of the horizontal frequency distribution curve 17 for determining the horizontal center coordinate of the contact 2 is also effected by counting the number of the black picture elements in the vertical direction. To this end, the sampled binary video signal by the clock signal is supplied to a carry input of a full adder 39, the sum output from which is directly supplied to a shift register 40. For example, assuming that g is equal to 1 with f also equal to 1, which means that the first sampled value during the first scanning line is logic "1" (black), the logic "1" is loaded into the shift register, since the full adder 39 is initially cleared (i.e. the initial content is zero and thus the sum output is equal to the input logic "1"). The contents placed in the shift register 40 is shifted by a clock signal having the same frequency as the sampling signal. It will be noted that the capacity of the full adder is so selected as to be capable of counting g binary bits at maximum. In a similar manner, the shift register 40 may be constructed from a parallel connection of shift register stages in number of g at maximum with the number of shift positions in each stage selected equal to f bits. For example, assuming that the sampling number f is selected equal to 100 with the number of scanning lines g equal to 128, the capacity of the full adder 39 may be of 7 bits, while the shift register 40 may be composed of 7 stages connected in parallel and each having 100 bits capacity in the shifting direction. With such arrangement, when a new sample value is supplied to the full adder 39, the added value therefrom is transferred to the shift register, whereby the contents in the shift register is shifted for one bit to the right as viewed in FIG. 7. When a single line scanning is completed after repetition of the above operation, the first sampled circuit (i.e. g=1 and f=1) reaches at the termination of the shift register after having been shifted for f bits. This output from the shift register 40 is again fed back to the full adder to be added with a new sampled signal input thereto which is a sampled result at the first address of the second scanning line, i.e. g=2 and f=1. If the new sampled signal is again logic "1", two sums are resulted, while the sum remains single for logic "0" of the new sampled signal. Thus, a binary number corresponding to these output states of the full adder is loaded into the shift register.

In this manner, the sampled signals obtained at the same addresses in the vertical direction are sequentially added together by the full adder and the resulted sums are stored in the shift register. The contents in the shift register is cleared at every termination of one frame by the vertical synchronizing signal $V_{sync}$ immediately after having been transferred to the memory 43. A counter 41 is provided to count the clock signal to correlate the sampling addresses with the contents in the shift register 40 through an address selector circuit 42.

In this way, the frequency distributions of the black picture elements in both of the vertical and the horizontal directions can be established or stored in the memories 36 and 43. Subsequently, the contents 101 and 103

(frequency distribution number or number of black picture elements) in these memories 36 and 43 corresponding to addresses designated by the address selectors 38 and 42 respectively are read out one by one and are supplied to the peak detector 13 which includes comparator means (not shown) As previously described, the peak detector 13 detects the coordinates or addresses 19 and 20 of the peak or maximum values in the vertical direction. As previously described, the center position calculating circuit 14 determines the vertical center position coordinate 23 ($X_0$) by averaging the coordinates 19 and 20 and determines the horizontal center position coordinate 24 ($Y_0$) by averaging the coordinates 21 and 22.

Figure 9:
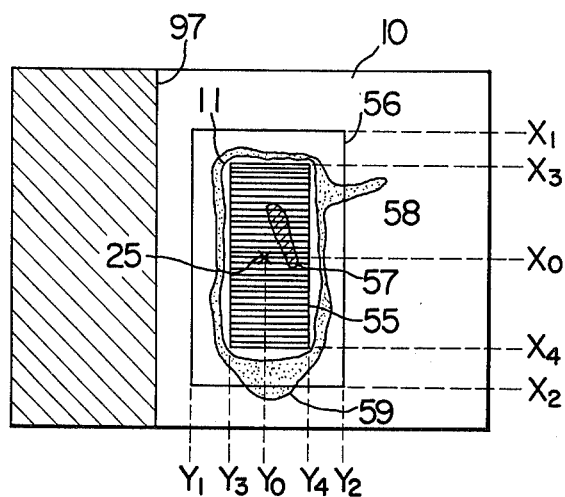
FIG. 9 illustrates a binary encoded signal image of a contact having failures in the surface thereof and in which an inner frame and an outer frame are defined.

Referring to FIG. 3, an inner frame generator circuit 45 is provided, the function of which will be now explained referring to FIG. 9. This circuit 45 is adapted to produce a gate signal 53 which is always at logic "1" level at all the coordinate positions within an inner frame 55 of a predetermined size of ($h_1-\epsilon_1$)×($h_2-\epsilon_2$) which is defined within the area of the contact 2 around the center position coordinate ($X_o$, $Y_o$) through the counters 37 and 41 which count up the clock signal for sampling the horizontal synchronizing signal $H_{sync}$ starting from the original at the coordinate ($X_o$, $Y_o$) determined by the center position calculating circuit 14.

Figure 13:
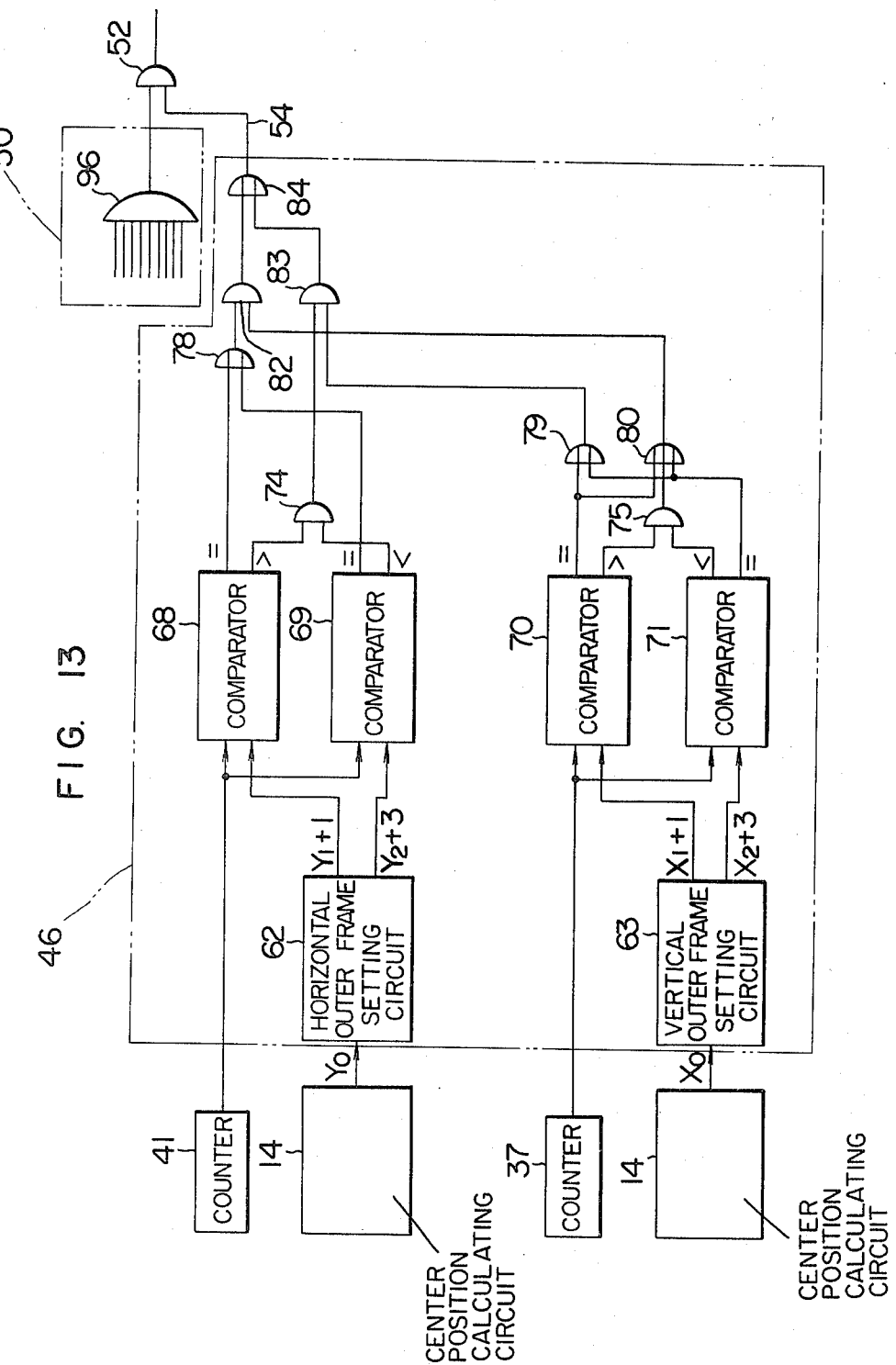
FIG. 13 is a circuit diagram showing an arrangement of an outer frame generator circuit shown in FIG. 3.

Further, an outer frame generator circuit 46 is provided which is adapted to produce a gate signal 54 which is always at a logic "1" at all coordinate positions in the outer side of an outer frame 56 of a predetermined size of ($h_1+2d$)×($h_2+2d$) defined around the periphery of the contact 2 about the center position coordinate ($X_0$, $Y_0$) as determined by the center position calculating circuit 14. More specifically, the outer frame 56 is defined in respect to the center position coordinate ($X_0$, $Y_0$) by segments $X_1=X_0-H_1=X_0-(h_{\frac{1}{2}}+d)$ and $X_2=X_0+H_1=X_0+(h_{\frac{1}{2}}+d)$ in the vertical direction and by segments $Y_1=Y_0-H_2=Y_0-(h_2/2+d)$ and $Y_2=Y_0+H_2=Y_0+(h_2/2+d)$ in the horizontal direction, as is shown in FIG. 9. For implementing the generation of such outer frame, reference is to be made to FIG. 13. More particularly, the horizontal synchronizing pulses $H_{sync}$ (or the scanning lines) is counted by the counter 37. When the scanning lines ($X_1+1$) and ($X_2+3$) set by a vertical outer frame setting circuit 63 have been attained, logic "1" signals are applied to an OR gate 79 from the comparators 70 and 71, respectively, while a logic "1" signal is produced from the AND gate 74 during an interval between ($Y_1+1$) and ($Y_2+3$), whereby a gate signal which becomes logic "1" during the intervals corresponding to the upper and lower edges of the outer frame 56 is produced by an AND gate 83. On the other hand, when the counts in the counter 41 for counting the sampling clock pulses has attained the numbers of clock pulses corresponding to ($Y_1+1$) and ($Y_2+3$) set in a horizontal outer frame setting circuit 62, logic "1" signals are applied to an OR gate 78 from comparators 68 and 69, while logic "1" signal is produced from an AND gate 75 during an interval between ($X_1+1$) and ($X_2+3$), whereby the gate signal which becomes logic "1" in the regions of the left and right edges of the outer frame 56 is produced from an AND gate 82. Thus, the gate signal 54 having logic "1" level only along the whole periphery of the outer frame 56 is produced from the OR gate 84.

The inner frame 55 is defined by the edges $X_3=X_0-H_3=X_0-(h_1-\epsilon_1)/2$ and $X_4=X_0+H_3=X_0+(h_1-\epsilon_1)/2$ in the vertical direction and by edges $Y_3=Y_0-H_4=Y_0-(h_2-\epsilon_2)/2$ and $Y_4=Y_0+H_4=Y_0+(h_2-\epsilon_2/2)$ in the horizontal direction, as is illustrated in FIG. 9. The generation of such an inner frame may be implemented in the circuit shown in FIG. 12. More specifically, the horizontal synchronizing pulses are counted by the counter 37 thereby to produce logic "1" signal through comparators 66; 67, the AND gate 73 and OR gate 77 during an interval between ($X_3+7$) and ($X_4+1$) set in a vertical inner frame setting circuit 61, while logic "1" signal is produced through comparators 64; 65, AND gate 72 and OR gate 76 during an interval between ($Y_3+7$) and ($Y_4+1$) set by a horizontal inner frame setting circuit 60. These logic "1" signals are both applied to an AND gate 81, whereby the gate signal 53 maintained at logic "1" level at any coordinates within the inner frame 55 is generated.

An inner frame binary encoding circuit 47 shown in FIG. 3 serves to convert the video signal derived from the TV camera 5 into a binary signal through comparison with a predetermined threshold value. The binary signal thus produced is then applied to a processing and determining circuit 49. An example of the processing and determinating circuit 49 will be explained in conjunction with FIG. 11a. An outer frame binary encoding circuit 48 also functions to convert the video signal from the TV camera 5 into a corresponding binary signal through comparison with a predetermined threshold value. The binary output from the circuit 48 is supplied to a processing and determinating circuit 50. An example of the processing and determining circuit 50 will be explained in conjunction with FIG. 10.

Figure 11A:
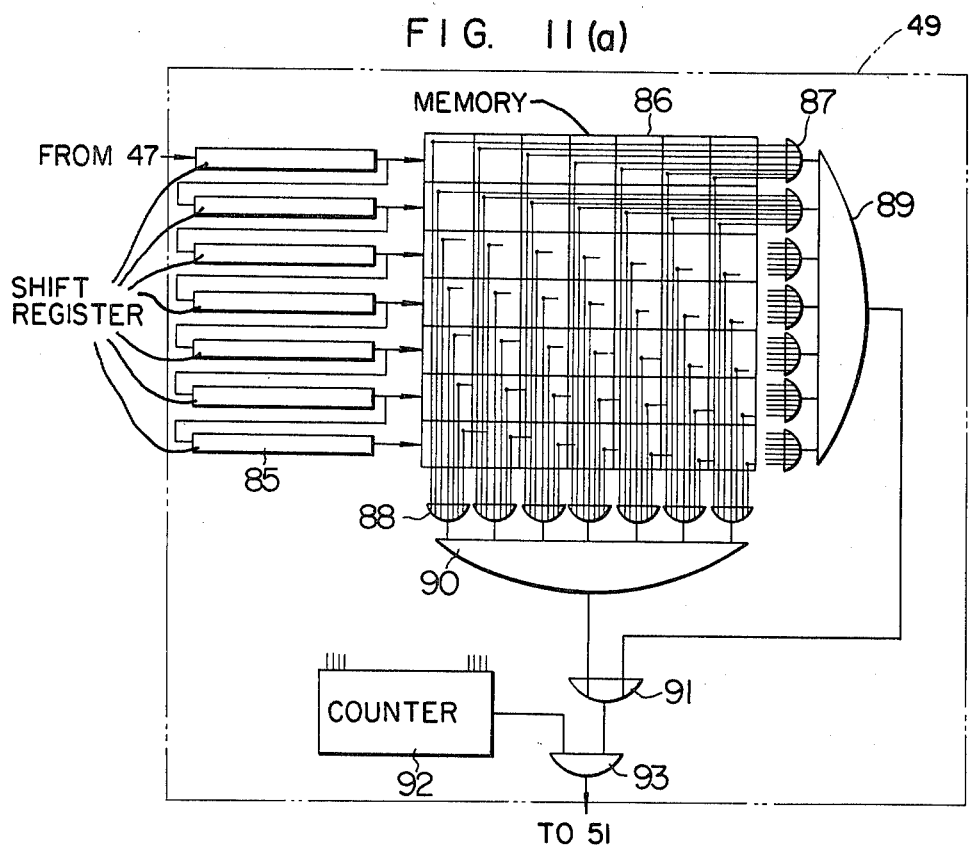
FIG. 11a is a circuit diagram showing an exemplary embodiment of an inner frame processing and determinating circuit shown in FIG. 3.
Figure 11B:
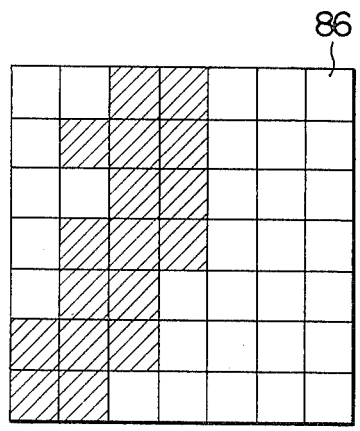
FIG. 11b illustrates a failure of a contact in a matrix array of 7×7 picture elements.

As is shown in FIG. 11a, the processing and determining circuit 49 is constituted by seven shift registers 85 connected in series to one another and adapted to store the number of samplings during a single scanning line, a memory 86 having storage locations in a matrix of 7×7 for storing signals for each of picture elements produced from the outputs of the shift registers 85, OR gates 87 and 88 connected at the row and column outputs of the memory 86, AND gates 89 and 90 connected at the outputs of the OR gates 87 and 88, respectively, an OR gate 91 having inputs coupled to the outputs of the AND gates 89 and 90, respectively, and a counter circuit 92 for counting the number of logic "1" signals each representing a black picture element over all the storage locations of the memory 86. The counter circuit 92 produces an output signal of logic "0" level when the count is less than 16 and produces logic "1" signal when the count attains or exceeds 16. The outputs of the counter 92 and the OR gate 91 are connected to the inputs of an AND gate 93. With such an arrangement of the evaluation circuit 49, when a logic "1" signal is stored in any of the storage locations in any of the rows of the matrix memory 86, associated OR gates 87 will produce logic "1" signal. Additionally, if the logic "1's" are stored successively in all rows of the memory 86, the AND gate 89 is then enabled to cause the OR gate 91 to produce a logic "1" signal which represents a failure in the contact 2. On the other hand, when the contents in the counter circuit 92 (i.e. the number of black picture elements) becomes equal to or greater than 16, the counter 92 outputs logic "1" which also represents the presence of failure in the contact 2. Accordingly, when the counts each representing a single picture element in black becomes equal to 17 and corresponding logic "1's" are stored in the memory 86 in a continuous manner in the column direction, as illustrated in FIG. 11b, the AND gate 93 is enabled to produce an output signal representing a failure pattern. In this connection, assuming that a single picture element is selected to correspond to 7 μm in size, then the total length of seven picture elements will amount to about 49 μm. Since the determination of failure is made for the presence of more than 16 picture elements in black, the width of the failure pattern will correspond to 16/7=2.3 elements or about 16 μm on an average. Thus, the area of contact 2 determined to have a failure is at least about 49 μm×16 μm.

Referring to FIG. 3, the output of the evaluation circuit 49 is coupled to an input of a gate circuit 51 which has the other input applied with the inner frame gate signal 53 from the inner frame generator circuit 45 and serves to determine if a failure is present in the area of the contact 2 covered by the inner frame 55. Thus, when the counter image 11 of the contact 2 is remarkably distorted into the region of the inner frame 55 or when a continuously extending large injury or foreign matter 57 is present on the surface of the contact 2, the failure determination is made. More specifically, the whole surface area of the contact 2 of less than the minimum standard of $(h_1-\epsilon_1)\times(h_2-\epsilon_2)$ or presence of a continuous injury or foreign matter of about 49 μm×16 μm in size provides a cause for determination of failure. In brief, the whole area of the inner frame 55 is scanned with a resolution of m×n picture elements in accordance with the size of the injury of foreign matter to be detected. In order to evade from the influences of noise or width of the injury of foreign matter, the number of black picture elements greater than a predetermined number T as well as continuity among these elements either in vertical or horizontal (column or row) direction are required for the determination of failure in the contact 2.

Figure 10:
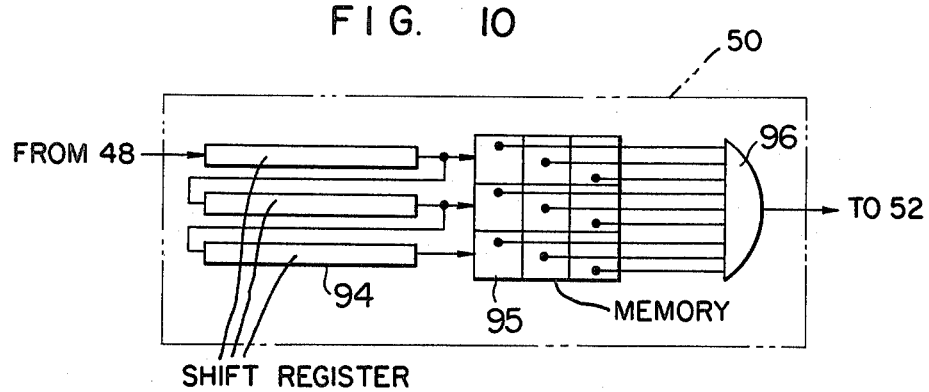
FIG. 10 is a circuit diagram showing an exemplary embodiment of an outer frame processing and determination circuit shown in FIG. 3.

Referring to FIG. 10, the processing and determinating circuit 50 is composed of three shift registers 94 connected in series and adapted to store the binary encoded video signal by sequentially shifting the corresponding bits for a number of samplings executed during a single scanning line, a memory 95 having storage locations of 3×3 for storing the signals produced from the output of the shift registers 94 for each picture elements, and an AND gate having inputs connected to all the storage locations of the memory 95. Thus, when a black failure of about 21 μm×21 μm in size is present in the contact, the processing and determinating circuit 50 produces an output signal representing the failure of the contact 2 through the AND gate 96. The output of the circuit 50 is connected to an input of a gate circuit 52 which has the other input applied with the outer frame gate signal 54 from the outer frame generator circuit 46 and serves to determine if failure is present over the outer frame 56. More specifically, when a welding dust 58 and a welding deformation 59 having a width e greater than about 21 μm are present transversely over the outer frame 56 defined around the contact 2 spaced therefrom by a distance d of about 0.2 mm, as is illustrated in FIG. 9, the contact 2 is determined as a failure contact, as represented by the logic "1" signal from the gate circuit 52. In this manner, the outer frame is scanned with a resolution of p×q in number of picture elements selected in accordance with the size of welding dust or deformation to be detected and the failure determination is made when all the scanned picture elements are black. In the illustrated example, the scanning of the outer frame is assumed to be made along the periphery of the outer frame. However, in the case where the contour 97 of the leaf spring 3 constituting the background of the contact 2 does not make appearance, the scanning can be effected over the whole area at the outside of the outer frame 56.

In the illustrated embodiment, since different threshold values are used for processing the video signals in the binary encoder circuits 47 and 48 for the scannings of the inner and outer frames, the influence due to difference in brightness between the contact 2 and the leaf spring 3 as caused by different reflection factor as well as the influence of noises can be suppressed to a minimum. It will be however noted that the binary encoder circuits 47 and 48 may be spared and the binary encoder circuit 9 can be used in common when the illumination of the light source 44 is increased in combination with the use of a TV camera having a high sensitivity.

As will become apparent from the foregoing description, the automatic external appearance inspection apparatus according to the invention which operates by determining the center position coordinate of an object to be examined from the contour thereof will allow positional deviation of the object from a standard position in a relatively large range of tolerance to be checked independently from unevenness in dimension of the object which is imposed with relatively severe dimensional requirement. Further, it is possible to detect a continuous failure of a certain size present on the surface of the object or article. Additionally, by virtue of the evaluation system using frames, the examination of whether the object is located within or outside of the frame can be made simultaneously with the examination as to whether a failure is present within or outside of a frame. Besides, by narrowing the area to be examined, the influence of noise, different reflection-factors or the like can be significantly reduced, whereby erroneous detection can be prevented, involving an improved reliability of the apparatus.

What is claimed is:

1. An apparatus for automatically checking the position of an object having a surface area of a predetermined size and a contour of the surface area, comprising:
    (a) an optical system which illuminates said object to produce an optical image having different bright and dark portions between said surface area of said object and said contour thereof;
    (b) an image pick-up device which scans said optical image in two-dimensional directions to produce a picture signal;
    (c) binary encoder circuit means which receives said picture signal from said image pick-up device, which thresholds said picture signal by a predetermined value to convert the same into a binary signal having two logical levels respectively corresponding to the bright and dark portions of said optical image, and which samples said binary signal with a predetermined time interval to convert the same into a binary picture element signal;
    (d) coordinate determining means which receives said binary picture element signal from said binary encoder circuit means, comprising means for counting said binary picture element signal in said two-dimensional directions with respect to one of said two logical levels to determine frequency distributions of the binary picture element signal in said two-dimensional directions with respect to said one logical level, and means for searching characteristic portions in said frequency distributions to extract coordinates of said contour of said object from said characteristic portions; and (e) first check means for checking whether or not said coordinates determined by said coordinate determining means are within an allowable tolerance range preselected for a two-dimensional coordinate area scanned and imaged by said image pick-up device.

2. An apparatus for automatically checking the external appearance of an object having a surface area of a predetermined size and a contour of the surface area, comprising:

(a) an optical system which illuminates said object to produce an optical image having different bright and dark portions between said surface area of said object and said contour thereof;

(b) an image pick-up device which scans said optical image in two-dimensional directions to produce a picture signal;

(c) binary encoder circuit means which receives said picture signal from said image pick-up device, which thresholds said picture signal by a predetermined value to convert the same into a binary signal having two logical levels respectively corresponding to the bright and dark portions of said optical image, and which samples said binary signal with a predetermined time interval to convert the same into a binary picture element signal;

(d) coordinate determining means which receives said binary picture element signal from said binary encoder circuit means, comprising means for counting said binary picture element signals in said two-dimensional directions with respect to one of said two logical levels to determine frequency distributions of the binary picture element signal in said two-dimensional directions with respect to said one logical level, and means for searching characteristic portions in said frequency distributions, to extract coordinates defined by said contour of said object from said characteristic portions;

(e) frame setting means which establishes a frame of a predetermined size in a two-dimensional coordinate area scanned and imaged by said image pick-up device on the basis of said coordinates determined by said coordinate determining means; and (f) second check means which sequentially shifts said binary picture element signal from said binary encoder circuit means inside or outside of said established frame to cut said binary picture element signal into an array of $m \times n$ picture elements, and which evaluates in the $m \times n$ picture element array the distribution of said binary picture element signal with respect to one of said two logical levels to check said surface area of said object.

3. An apparatus according to claim 2, wherein said binary encoder circuit means includes at least two binary encoder circuits having different threshold values, an output signal from one of said two binary encoder circuits being applied to said coordinate determining means and an output signal from the other binary encoder circuit being applied to said second check means.

4. An apparatus according to claim 2, wherein said frame setting means includes inner frame setting means for establishing an inner frame whose size is smaller than the size of said object by a predetermined dimension, and said second check means includes means for evaluating said object as a fault when the binary picture element signals of a logical level opposite to the logical level corresponding to said surface area of said object continuously appear in at least one of row and column directions of said $m \times n$ picture element array inside of said inner frame established by said inner frame setting means.

5. An apparatus according to claim 3, wherein said frame setting means includes inner frame setting means for establishing an inner frame whose size is smaller than the size of said object by a predetermined dimension, and said second check means includes means for evaluating said object as a fault when the binary picture element signals of a logical level opposite to the logical level corresponding to said surface area of said object continuously appear in at least one of row and column directions of said $m \times n$ picture element array inside of said inner frame established by said inner frame setting means.

6. An apparatus according to claim 2, wherein said frame setting means includes inner frame setting means for establishing an inner frame whose size is smaller than the size of said object by a predetermined dimension, and said second check means includes means for evaluating said object as a fault when the binary picture element signals of a logical level opposite to the logical level corresponding to said surface area of said object continuously appear in at least one of row and column directions of said $m \times n$ picture element array inside of said inner frame established by said inner frame setting means and when the number of picture elements having said opposite logical level within said $m \times n$ picture element array exceeds a predetermined value.

7. An apparatus according to claim 3, wherein said frame setting means includes inner frame setting means for establishing an inner frame whose size is smaller than the size of said object by a predetermined dimension, and said second check means includes means for evaluating said object as a fault when the binary picture element signals of a logical level opposite to the logical level corresponding to said surface area of said object continuously appear in at least one of row and column directions of said $m \times n$ picture element array inside of said inner frame established by said inner frame setting means and when the number of picture elements having said opposite logical level within said $m \times n$ picture element array exceeds a predetermined value.

8. An apparatus according to claim 2, wherein said frame setting means includes outer frame setting means for establishing an outer frame whose size is larger than the size of said object by a predetermined dimension, and said second check means includes means for evaluating said object as a fault when the same binary picture element signal level as the logical level corresponding to said contour of said object appear for all the picture elements within said $m \times n$ picture element array outside of said outer frame established by said outer frame setting means.

9. An apparatus according to claim 3, wherein said frame setting means includes outer frame setting means for establishing an outer frame whose size is larger than the size of said object by a predetermined dimension, and said second check means includes means for evaluating said object as a fault when the same binary picture element signal level as the logical level corresponding to said contour of said object appear for all the picture elements within said $m \times n$ picture element array outside of said outer frame established by said outer frame setting means.

10. An apparatus according to claim 4, wherein said frame setting means includes outer frame setting means for establishing an outer frame whose size is larger than the size of said object by a predetermined dimension, and said second check means includes means for evaluating said object as a fault when the same binary picture element signal level as the logical level corresponding to said contour of said object appear for all the picture elements within said m×n picture element array outside of said outer frame established by said outer frame setting means.

11. An apparatus according to claim 6, wherein said frame setting means includes outer frame setting means for establishing an outer frame whose size is larger than the size of said object by a predetermined dimension, and said second check means includes means for evaluating said object as a fault when the same binary picture element signal level as the logical level corresponding to said contour of said object appear for all the picture elements within said m×n picture element array outside of said outer frame established by said outer frame setting means.

12. An apparatus for automatically checking the external appearance of an object having a surface area of a predetermined size and a contour of the surface area, comprising:
 (a) an optical system which illuminates said object to produce an optical image having different bright and dark portions between said surface area of said object and said contour thereof;
 (b) an image pick-up device which scans said optical image in two-dimensional directions to produce a picture signal;
 (c) binary encoder circuit means which receives said picture signal from said image pick-up device, which thresholds said picture signal by a predetermined value to convert the same into a binary signal having two logical levels respectively corresponding to the bright and dark portions of said optical image, and which samples said binary signal with a predetermined time interval to convert the same into a binary picture element signal;
 (d) coordinate determining means which receives said binary picture element signal from said binary encoder circuit means, comprising means for counting said binary picture element signal in said two-dimensional directions with respect to one of said two logical levels to determine frequency distributions of the binary picture element signal in said two-dimensional directions with respect to said one logical level, and means for searching characteristic portions in said frequency distributions to extract coordinates defined by said contour of said object from said characteristic portions;
 (e) first check means which checks whether or not said coordinates determined by said coordinate determining means are within an allowable tolerance range preselected for a two-dimensional coordinate area scanned and imaged by said image pick-up device;
 (f) frame setting means which establishes a frame of a predetermined size in a two-dimensional coordinate area scanned and imaged by said image pick-up device on the basis of said coordinates determined by said coordinate determining means; and
 (g) second check means which sequentially shifts said binary picture element signal from said binary encoder circuit means inside or outside of said established frame to cut said binary picture element signal into an array of m×n picture elements, and which evaluates in the m×n picture element array the distribution of said binary picture element signal with respect to one of said two logical levels to check said surface area of said object.

13. An apparatus according to claim 12, wherein said binary encoder circuit means includes at least two binary encoder circuits having different threshold values, an output signal from one of said two binary encoder circuits being applied to said coordinate determining means and an output signal from the other binary encoder circuit being applied to said second check means.

14. An apparatus according to claim 12, wherein said frame setting means includes inner frame setting means for establishing an inner frame whose size is smaller than the size of said object by a predetermined dimension, and said second check means includes means for evaluating said object as a fault when the binary picture element signals of a logical level opposite to the logical level corresponding to said surface area of said object continuously appear in at least one of row and column directions of said m×n picture element array inside of said inner frame established by said inner frame setting means.

15. An apparatus according to claim 13, wherein said frame setting means includes inner frame setting means for establishing an inner frame whose size is smaller than the size of said object by a predetermined dimension, and said second check means includes means for evaluating said object as a fault when the binary picture element signals of a logical level opposite to the logical level corresponding to said surface area of said object continuously appear in at least one of row and column directions of said m×n picture element array inside of said inner frame established by said inner frame setting means.

16. An apparatus according to claim 12, wherein said frame setting means includes inner frame setting means for establishing an inner frame whose size is smaller than the size of said object by a predetermined dimension, and said second check means includes means for evaluating said object as a fault when the binary picture element signals of a logical level opposite to the logical level corresponding to said surface area of said object continuously appear in at least one of row and column directions of said m×n picture element array inside of said inner frame established by said inner frame setting means and when the number of picture elements having said opposite logical level within said m×n picture element array exceeds a predetermined value.

17. An apparatus according to claim 13, wherein said frame setting means includes inner frame setting means for establishing an inner frame whose size is smaller than the size of said object by a predetermined dimension, and said second check means includes means for evaluating said object as a fault when the binary picture element signals of a logical level opposite to the logical level corresponding to said surface area of said object continuously appear in at least one of row and column directions of said m×n picture element array inside of said inner frame established by said inner frame setting means and when the number of picture elements having said opposite logical level within said m×n picture element array exceeds a predetermined value.

18. An apparatus according to claim 12, wherein said frame setting means includes outer frame setting means for establishing an outer frame whose size is larger than the size of said object by a predetermined dimension, and said second check means includes means for evaluating said object as a fault when the same binary picture element signal level as the logical level corresponding to said contour of said object appear for all the picture elements within said m × n picture element array outside of said outer frame established by said outer frame setting means.

19. An apparatus according to claim 13, wherein said frame setting means includes outer frame setting means for establishing an outer frame whose size is larger than the size of said object by a predetermined dimension, and said second check means includes means for evaluating said object as a fault when the same binary element signal level as the logical level corresponding to said contour of said object appear for all the picture elements within said m × n picture element array outside of said outer frame established by said outer frame setting means.

20. An apparatus according to claim 14, wherein said frame setting means includes outer frame setting means for establishing an outer frame whose size is larger than the size of said object by a predetermined dimension, and said second check means includes means for evaluating said object as a fault when the same binary picture element signal level as the logical level corresponding to said contour of said object appear for all the picture elements within said m × n picture element array outside of said outer frame established by said outer frame setting means.

21. An apparatus according to claim 16, wherein said frame setting means includes outer frame setting means for establishing an outer frame whose size is larger than the size of said object by a predetermined dimension, and said second check means includes means for evaluating said object as a fault when the same binary picture element signal level as the logical level corresponding to said contour of said object appear for all the picture elements within said m × n picture element array outside of said outer frame established by said outer frame setting means.

22. An apparatus according to claim 2, wherein the means for searching the characteristic portions of said frequency distributions is a peak detector.

23. An apparatus according to claim 12, wherein the means for searching the characteristic portions of said frequency distributions is a peak detector.

* * * * *